(12) United States Patent
Cong et al.

(10) Patent No.: US 12,280,741 B2
(45) Date of Patent: Apr. 22, 2025

(54) CONTROL APPARATUS AND METHOD FOR LOCKING OR UNLOCKING DOOR

(71) Applicants: Hyundai Motor Company, Seoul (KR); Kia Corporation, Seoul (KR)

(72) Inventors: Bing Le Cong, Yantai (CN); Jing Song Sun, Yantai (CN); Xu Qiang Sun, Yantai (CN)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 10 days.

(21) Appl. No.: 18/108,972

(22) Filed: Feb. 13, 2023

(65) Prior Publication Data

US 2024/0051498 A1    Feb. 15, 2024

(30) Foreign Application Priority Data

Nov. 28, 2022    (CN) .................. 202211501605.X (51) Int. Cl.
*B60R 25/24* (2013.01)
*B60R 25/34* (2013.01)
*E05B 81/56* (2014.01)
*E05B 83/36* (2014.01)

(52) U.S. Cl.
CPC ............ *B60R 25/245* (2013.01); *B60R 25/34* (2013.01); *E05B 81/56* (2013.01); *E05B 83/36* (2013.01)

(58) Field of Classification Search
CPC ....... B60R 25/34; B60R 25/245; E05B 81/56; E05B 83/36
See application file for complete search history.

(56) References Cited

U.S. PATENT DOCUMENTS

| | | | | |
|---|---|---|---|---|
| 5,613,732 A * | 3/1997 | Demick | ................. | B60N 2/797 297/188.19 |
| 2005/0258936 A1* | 11/2005 | Ghabra | ................. | B60R 25/245 340/5.72 |
| 2010/0090491 A1* | 4/2010 | Hipshier | ................... | B60R 7/04 296/24.34 |
| 2011/0202201 A1* | 8/2011 | Matsubara | .............. | B60R 25/00 701/2 |
| 2015/0332530 A1* | 11/2015 | Kishita | ................. | B60R 25/245 70/256 |
| 2016/0272152 A1* | 9/2016 | Iwata | ................. | G07C 9/00309 |
| 2017/0305333 A1* | 10/2017 | Delgado | ............. | B60Q 1/2696 |

* cited by examiner

*Primary Examiner* — Yong Hang Jiang
(74) *Attorney, Agent, or Firm* — Morgan, Lewis & Bockius LLP (57) ABSTRACT

A control apparatus and a method for locking or unlocking a door include a smart key including a door locking and unlocking button provided thereon and configured for transmitting a control signal for locking or unlocking the door through a door locking and unlocking button; a smart key check module configured to determine whether the smart key is in a vehicle; and a door control module configured to determine whether the vehicle is in a started state or a turned-off state, determine whether to receive a control signal for locking or unlocking the door from the smart key according to a result of the determining whether the smart key is in the vehicle when the vehicle is in the started state, and control a corresponding door of the vehicle when receiving the control signal for locking or unlocking the door from the smart key.

16 Claims, 12 Drawing Sheets

CONTROL APPARATUS AND METHOD FOR LOCKING OR UNLOCKING DOOR

CROSS-REFERENCE TO RELATED APPLICATION

The present application claims priority to and the benefit of Chinese Patent Application No. 202211501605.X filed in the Chinese National Intellectual Property Administration on Nov. 28, 2022, the entire contents of which is incorporated herein for all purposes by this reference.

BACKGROUND OF THE PRESENT DISCLOSURE

Field of the Present Disclosure

The present disclosure relates to the field of vehicle control. More particularly, the present disclosure relates to a control apparatus and a method for locking or unlocking a door.

Description of Related Art

A vehicle cabin is provided in vehicles so that a driver or accompanying passengers can get in the vehicles and doors for opening/closing the vehicle cabin are provided on the vehicles. In general, various buttons such as buttons for locking or unlocking the doors and buttons for adjusting heights of windows are provided on armrests on door trims inside the vehicles. Furthermore, doorknobs are provided on external sides of vehicles. A user unlocks the door using a key and opens the door by operating the doorknob.

Furthermore, automotive smart keys have recently been developed. When a user with a smart key enters into a detecting range of a vehicle employing the smart key and presses a door unlocking button of the smart key, the smart key sends out a door unlocking signal. The vehicle authenticates the smart key in response to the door unlocking signal, the vehicle unlocks the doors after authentication, and the user can manually pull and open the door.

However, as described above, the buttons for locking or unlocking doors is provided on both the smart key and the armrests of the door trims. Because functions of two buttons provided at different positions are the same, installation of unnecessary buttons increases cost of the vehicle and increases operation difficulty of a user.

Furthermore, the vehicle can receive a control signal for locking or unlocking doors only when the vehicle is in a turned-off state. This means that the user no longer use the smart key after starting the vehicle, so it is possible to leave the smart key anywhere, which increases the possibility of a loss of the smart key. At present, a vehicle sharing technology system (i.e., urban rent-a-car) has been introduced, and there is no place to keep the smart key in shared cars or rental cars, so a user doesn't find the smart key after driving in some cases.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a control apparatus and a method for locking or unlocking a door, the apparatus and method configured to substitute a smart key for the function of a door locking and unlocking button on an armrest of a door trim.

Because a user can control locking or unlocking of the door by operating the smart key when a vehicle is in a started state and the smart key is in the vehicle, it is possible to reduce costs for mounting the door locking and unlocking button on the armrest of the door trim, and an integrated design of the door locking and unlocking button on the smart key can reduce operation difficulty of the user.

According to various exemplary embodiments of the present disclosure, there is provided a control apparatus of locking or unlocking a door, the control apparatus including: a smart key including a door locking and unlocking button provided thereon and configured for transmitting a control signal for locking or unlocking the door through a door locking and unlocking button; a smart key check module configured to determine whether the smart key is in a vehicle; and a door control module configured to determine whether the vehicle is in a started state or a turned-off state, determine whether to receive a control signal for locking or unlocking the door from the smart key according to a result of the determining whether the smart key is in the vehicle when the vehicle is in the started state, and control a corresponding door of the vehicle when receiving the control signal for locking or unlocking the door from the smart key.

The door control module is configured to receive the control signal for locking or unlocking the door from the smart key when the vehicle is in the turned-off state.

The door control module is configured to receive the control signal for locking or unlocking the door from the smart key when the smart key check module concludes that the smart key is in the vehicle when the vehicle is in the started state.

The door control module is configured not to receive a control signal for locking or unlocking the door from the smart key when the smart key check module concludes that the smart key is not in the vehicle when the vehicle is in the started state.

The smart key check module is configured to determine whether the smart key is in the vehicle when the door is opened or closed or when a button for starting the vehicle is pressed.

The smart key is configured to be disposed in an accommodation groove on an armrest of a door trim, and a door locking and unlocking button is not provided on the armrest of the door trim.

A magnet is provided in at least one of the smart key and the accommodation groove, and the smart key is attachable in the accommodation groove by the magnet.

The smart key and the accommodation groove are matched through a protrusion and a depression thereof.

A slot for disposing and picking up the smart key is further provided at an end portion of the accommodation groove.

The accommodation groove is disposed in a longitudinal direction of the armrest or a direction vertical to the longitudinal direction.

According to various exemplary embodiments of the present disclosure, there is provided a control method for locking or unlocking a door, the control method including: transmitting a control signal for locking or unlocking the door through a door locking and unlocking button provided on a smart key; determining whether the smart key is in a vehicle by a smart key check module; determining whether the vehicle is in a started state or a turned-off state by a door control module; determining whether to receive the control signal for locking or unlocking the door from the smart key by the door control module according to a result of the determining whether the smart key is in the vehicle when the vehicle is in the started state; and controlling a corresponding door of the vehicle by the door control module when receiving a control signal for locking or unlocking the door from the smart key.

The control signal for locking or unlocking the door is received from the smart key by the door control module when the vehicle is in the turned-off state.

The control signal for locking or unlocking the door is received from the smart key by the door control module when the smart key check module concludes that the smart key is in the vehicle when the vehicle is in the started state.

The control signal for locking or unlocking the door is not received from the smart key by the door control module if it is determined that the smart key is not in the vehicle when the vehicle is in the started state.

Whether the smart key is in the vehicle is determined by the smart key check module when the door is opened or closed or when a button for starting the vehicle is pressed.

The smart key is disposed in an accommodation groove on an armrest of a door trim, and a door locking and unlocking button is not provided on the armrest of the door trim.

A magnet is disposed in each of the smart key and the accommodation groove, and the smart key may be attached in the accommodation groove by the magnets.

The smart key and the accommodation groove are matched through a protrusion and a depression thereof.

A slot for disposing and picking up the smart key is further provided at an end portion of the accommodation groove.

The accommodation groove is disposed in a longitudinal direction of the armrest or a direction vertical to the longitudinal direction.

The present disclosure utilizes the technical means described above and has the following advantageous effects.

Because the smart key substitutes for the door locking and unlocking button provided on the armrest of the door trim Generally, it is possible to decrease the costs for mounting the door locking and unlocking button on the armrest of the door trim.

Furthermore, the integrated design of the door locking and unlocking button on the smart key can reduce operation difficulty of the user.

The space in which the door locking and unlocking button was disposed on the door trim in the related art is used as the accommodation groove for disposing the smart key, and the user can conveniently keep the smart key in a fixed place, so it is possible to prevent a loss of the smart key. As for shared cars or rental cars, the user is not only prevented from losing the smart key, but also regulates use of the cars.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereafter, embodiments of the present disclosure are described in detail, are implemented under the assumption of technical plans of the present disclosure, and show detailed exemplary embodiments and detailed operation processes, but the protection range of the present disclosure is not limited by the following embodiments.

Figure 1:
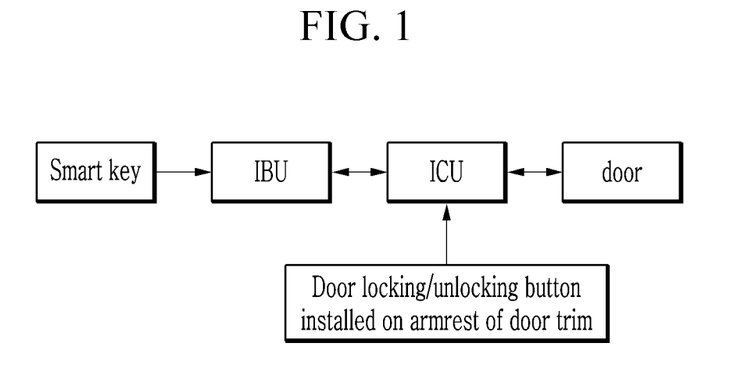
FIG. 1 is a block diagram of a common control apparatus of locking or unlocking a door.

FIG. 1 is a block diagram of a common control apparatus of locking or unlocking a door. As shown in FIG. 1, a common control apparatus of locking or unlocking a door includes a smart key, a door locking and unlocking button provided on an armrest of a door trim, and an Integrated Body Unit (IBU) and an integrated control unit (ICU) provided in a vehicle.

A door locking and unlocking button is provided on the smart key. When a user moves with the smart key close to or away from the vehicle, the smart key is configured to transmit a control signal for locking or unlocking the door through the door locking and unlocking button. The control signal may be a Radio Frequency (RF) signal. The IBU provided in the vehicle may include an RF receiver for receiving the RF signal of the smart key. The IBU converts the RF signal of the smart key into a CAN signal and transmits the CAN signal to the ICU through Control Area Network (CAN) communication of the vehicle. After receiving the CAN signal, the ICU is configured to control locking and unlocking of the door by controlling an electronic relay of the vehicle. For example, the ICU is configured to control forward rotation and backward rotation of a motor using two-single contact points relay bridge connection method, and it is possible to lock or unlock the door using the forward rotation and the backward rotation of the motor.

Furthermore, only when the vehicle is turned off, for example, only when the user approaches the vehicle parked in a parking lot and unlocks the door using the smart key, or only when the user locks the door using the smart key after turning off the vehicle and getting out of the vehicle, the IBU can receive the control signal (i.e., the RF signal) for locking or unlocking the door from the smart key. When the vehicle is in a started state, the IBU does not receive the control signal (i.e., the RF signal) for locking or unlocking the door from the smart key.

However, the door locking and unlocking button provided on the armrest of the door trim may be directly connected to the ICU through a wired connection type. Furthermore, regardless of whether the vehicle is in the turned-off state or not, the control signals for locking or unlocking the door that are transmitted through the door locking and unlocking button provided on the armrest of the door trim may be all directly transmitted to the ICU. Similarly, after receiving the control signal, the ICU is configured to control locking and unlocking of the door by controlling the electronic relay of the vehicle.

As described above, the buttons for locking or unlocking the door are provided on the smart key and the armrest of the door trim, and the functions of these two buttons provided at different positions are the same, so installation of an unnecessary button increases cost of the vehicle.

In consideration of the problems in the common control apparatus of locking or unlocking the door, a control apparatus of locking or unlocking the door according to various exemplary embodiments of the present disclosure substitutes for the functions of the door locking and unlocking button provided on the armrest of the door trim using the smart key, so it is possible to reduce the costs for installing the door locking and unlocking button on the armrest of the door trim.

Figure 2A:
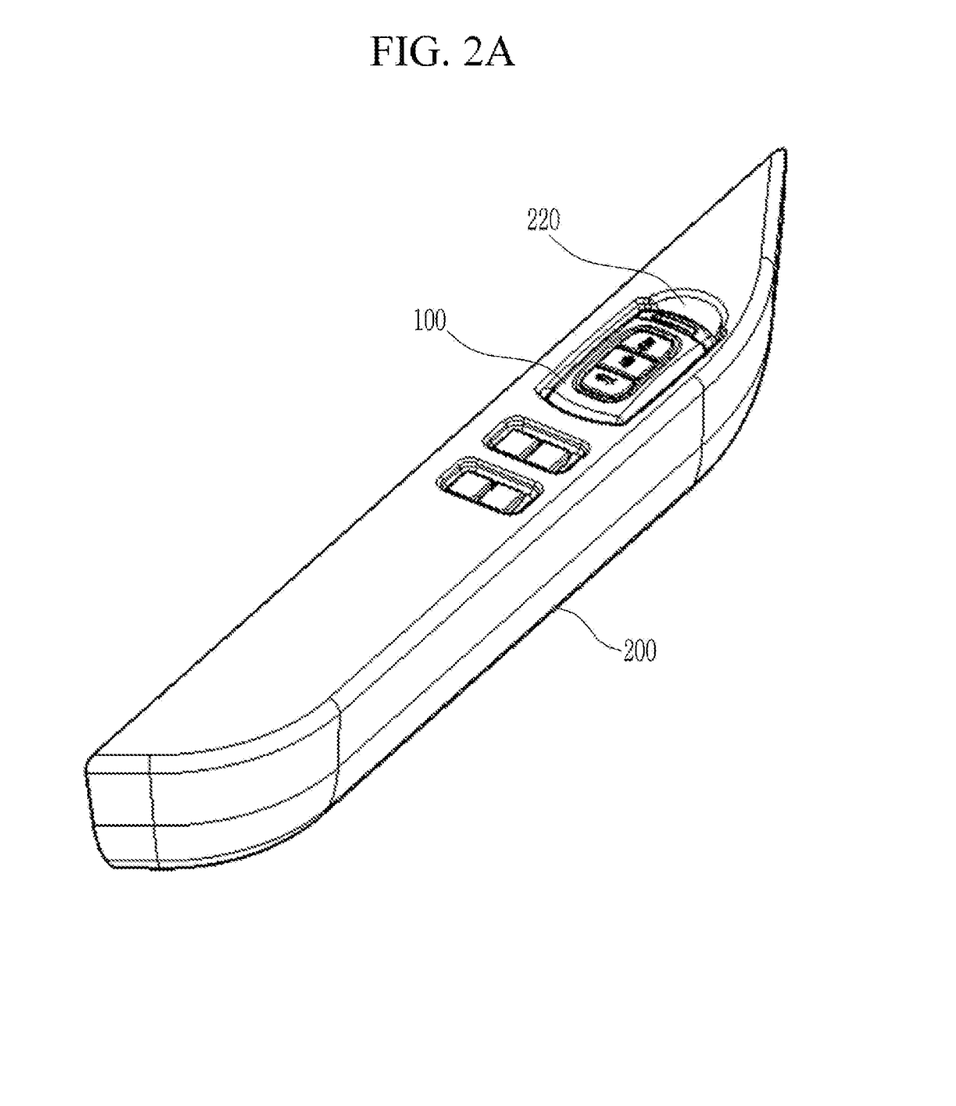
FIG. 2A and FIG. 2B are schematic diagrams showing a smart key of a control apparatus of locking or unlocking the door and an armrest of a door trim according to various exemplary embodiments of the present disclosure.
Figure 2B:
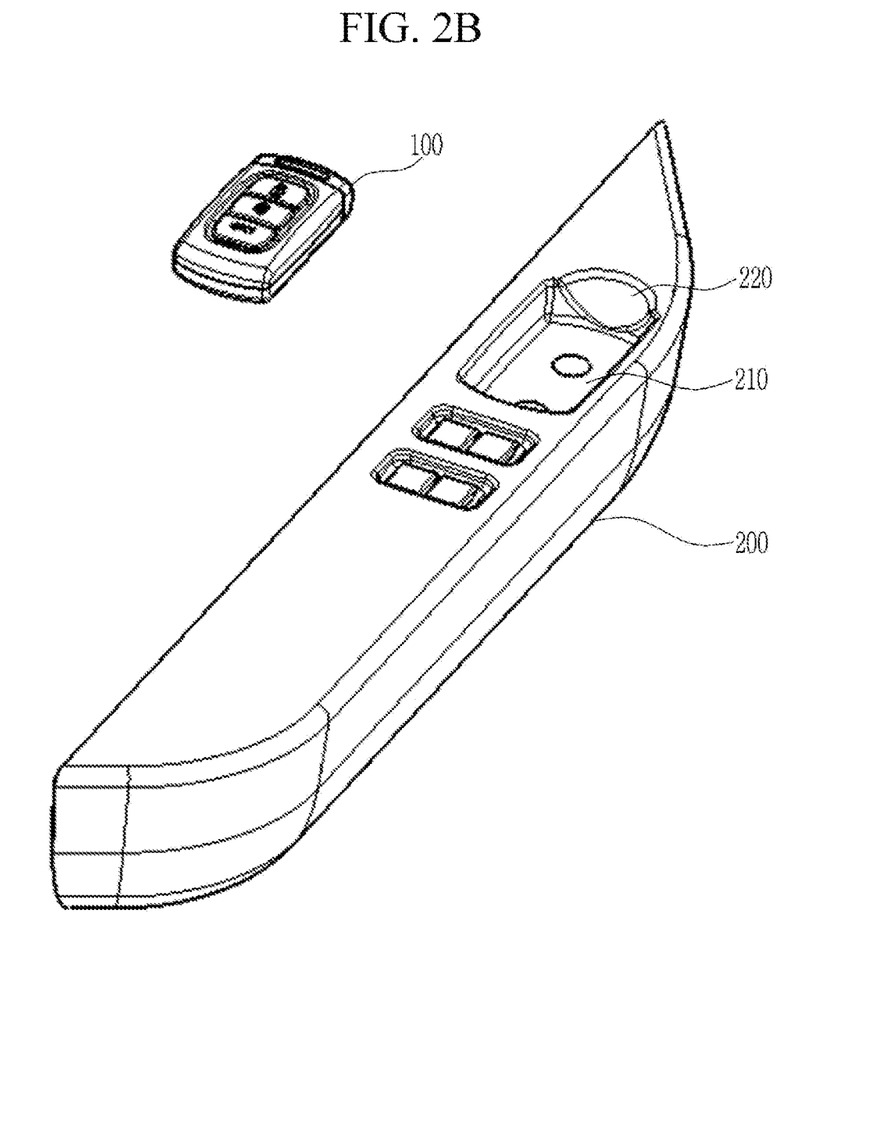

FIG. 2A and FIG. 2B are schematic diagrams showing a smart key of the control apparatus of locking or unlocking the door and the armrest of the door trim according to various exemplary embodiments of the present disclosure. As shown in FIG. 2A and FIG. 2B, the smart key 100 may be disposed in an accommodation groove 210 on the armrest 200 of the door trim and the door locking and unlocking button is not provided on the armrest 200 of the door trim.

The position of the accommodation groove 210 on the armrest 200 of the door trim is a position where the existing door locking and unlocking button was positioned, and the smart key 100 disposed in the accommodation groove 210 substitutes for the functions of the existing door locking and unlocking button.

Furthermore, according to various exemplary embodiments of the present disclosure, a space in which the existing door locking and unlocking button on the door trim is disposed is used as the accommodation groove 210 for disposing the smart key 100, and the user may conveniently keep the smart key 100 in a fixed place (i.e., in the accommodation groove 210), so it is possible to prevent a loss of the smart key 100. It is possible to regulate use of shared cars or rental cars.

Hereafter, structures of the smart key and the armrest of the door trim are described in detail.

As shown in FIG. 2A and FIG. 2B, a slot 220 for a user to put on or pick up the smart key is further provided at any one end portion of the accommodation groove 210 on the armrest 200 of the door trim.

Figure 3:
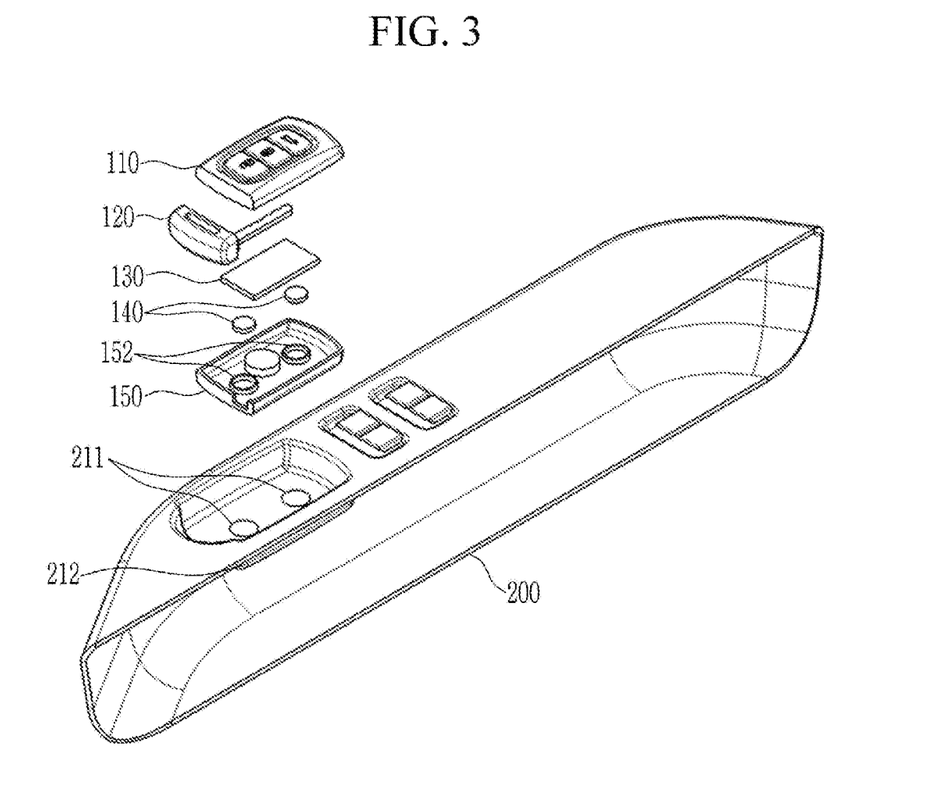
FIG. 3 is a schematic exploded view of the smart key of the control apparatus of locking or unlocking the door and the armrest of the door trim according to various exemplary embodiments of the present disclosure.

FIG. 3 is a schematic exploded view of the smart key of the control apparatus of locking or unlocking the door and the armrest of the door trim according to various exemplary embodiments of the present disclosure. As shown in FIG. 3, the smart key 100 includes an upper cover 110, a mechanical key 120, a Printed Circuit Board (PCB) module 130, steel members 140, and a lower cover 150. The material of the upper cover 110 and the lower cover 150 may be Unsaturated Polyester Resin (UPR).

Figure 4A:
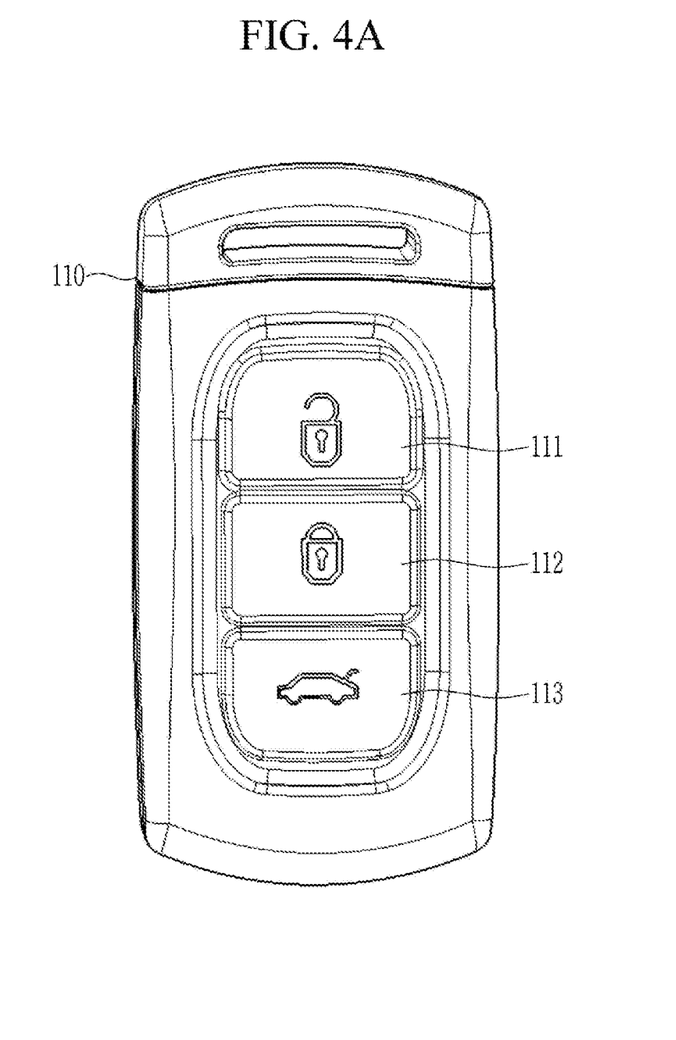
FIG. 4A and FIG. 4B are a front view and a rear view of the smart key of the control apparatus of locking or unlocking the door according to various exemplary embodiments of the present disclosure.
Figure 4B:
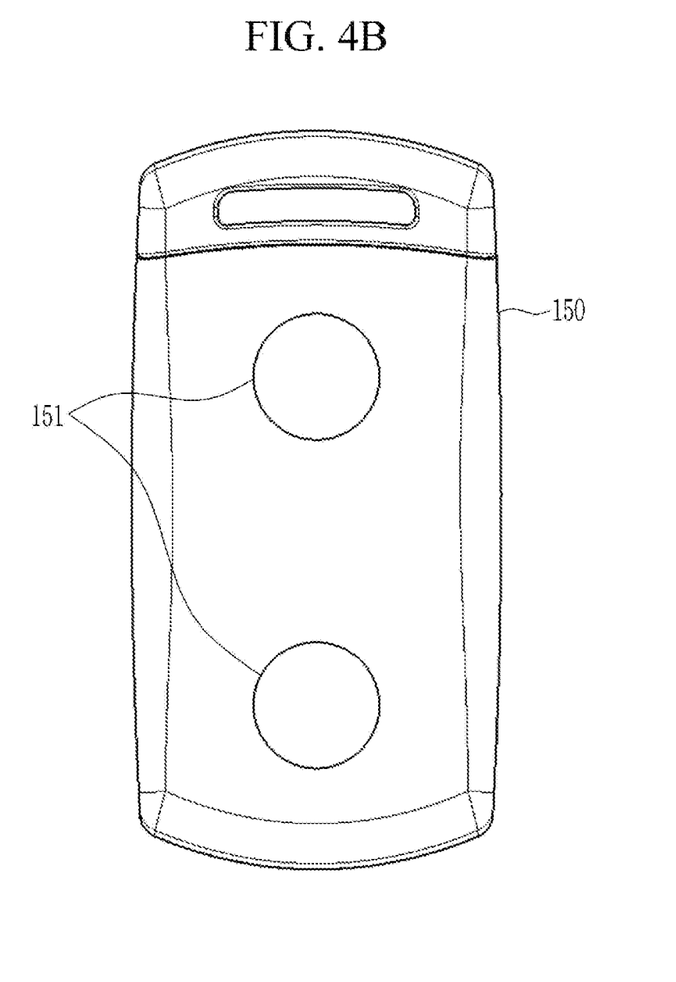

FIG. 4A and FIG. 4B are a front view and a rear view of the smart key of the control apparatus of locking or unlocking the door according to various exemplary embodiments of the present disclosure. As shown in FIG. 4A, a button 111 for unlocking the door, a button 112 for locking the door, and a button 113 for opening a trunk are provided on the upper cover 110. As shown in FIG. 4B, two circular concave grooves 151 are provided on the lower cover 150.

Referring to FIG. 3 again, when there is no electricity or the amount of electricity is low in the smart key 100, the user has to pull out the mechanical key 120, insert the mechanical key 120 in a keyhole of the vehicle, and then open the door. Various functions of the smart key 100 are achieved through a circuit provided in the PCB module 130. The steel members 140 are magnets and fixing members 152 for fixing the steel members 140 are provided inside the lower cover 150.

Two circular protrusions 211 are provided on a surface of the accommodation groove 210 to correspond to the two circular concave grooves 151 of the lower cover 150. The circular concave grooves 151 and the circular protrusions 211 are fitted to each other so that the smart key 100 and the accommodation groove 210 are matched through a protrusions and depressions structure, so it is possible to easily determine a disposition position of the smart key 100.

Figure 5:
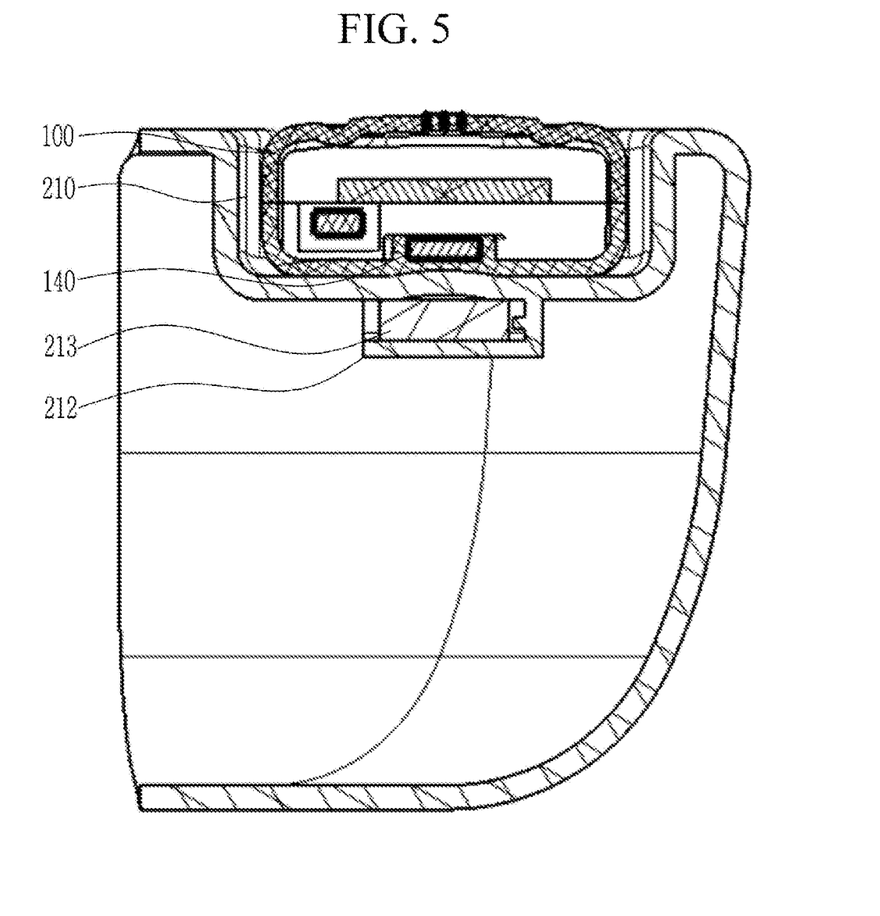
FIG. 5 is a schematic diagram showing a cross-section of the smart key of the control apparatus of locking or unlocking the door and the armrest of the door trim according to various exemplary embodiments of the present disclosure.

A magnet box 212 is provided on a bottom portion of the accommodation groove 210 and the magnet is provided in the magnet box 212. FIG. 5 is a schematic diagram showing a cross-section of the smart key of the control apparatus of locking or unlocking the door and the armrest of the door trim according to various exemplary embodiments of the present disclosure. The steel members 140 that are magnets are disposed in the smart key 100 and the magnet 213 is disposed in the accommodation groove 210, so that the smart key 100 may be attached in the accommodation groove 210 by the steel members 140 and the magnet 213. Although the smart key 100 is disposed in the accommodation groove 210 using the magnetism of the magnets in various exemplary embodiments of the present disclosure, the present disclosure is not limited thereto.

Figure 6:
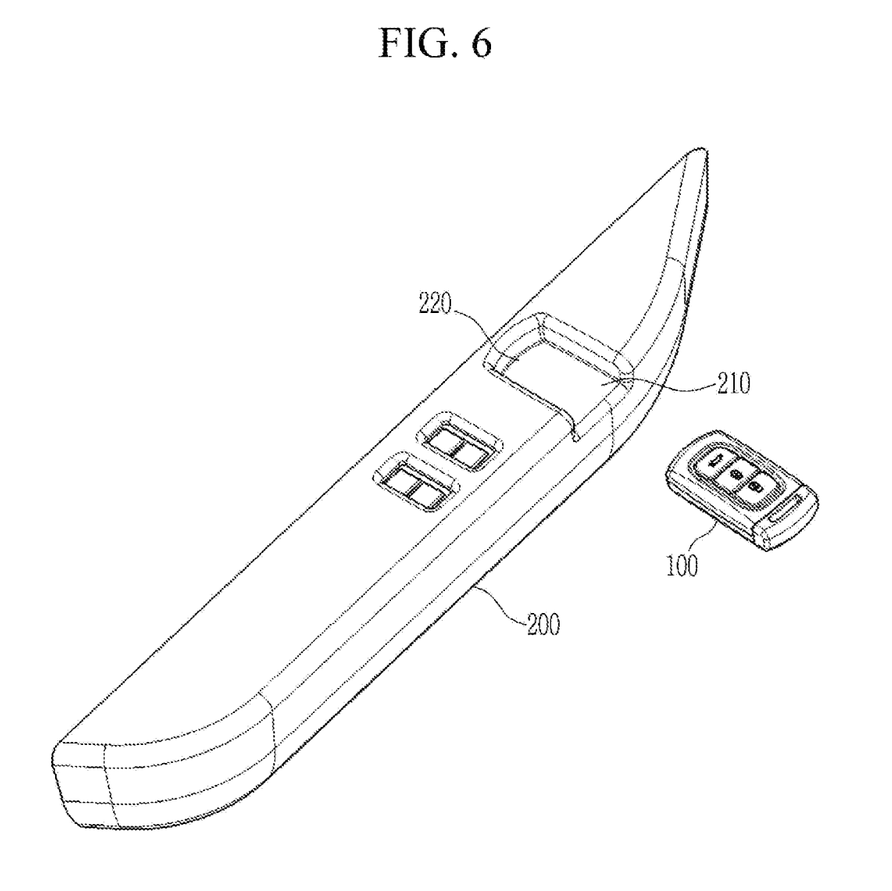
FIG. 6 is a schematic diagram showing a smart key of a control apparatus of locking or unlocking a door and an armrest of a door trim according to various exemplary embodiments of the present disclosure.

The accommodation groove 210 shown in FIG. 2A, FIG. 2B, and FIG. 3 is disposed in a horizontal direction with respect to the armrest 200 of the door trim, but the present disclosure is not limited thereto. FIG. 6 is a structure schematic diagram showing a smart key of a control apparatus of locking or unlocking a door and an armrest of a door trim according to various exemplary embodiments of the present disclosure. As shown in FIG. 6, the accommodation groove 210 is disposed in a vertical direction with respect to the armrest 200 of the door trim.

According to various exemplary embodiments of the present disclosure, it is required to improve a signal transmission logic of the common control apparatus of locking or unlocking the door even after mounting the smart key instead of the door locking and unlocking button that was provided on the armrest of the door trim. That is, it may be possible to lock or unlock the door through the smart key when the vehicle is in the started state.

Figure 7:
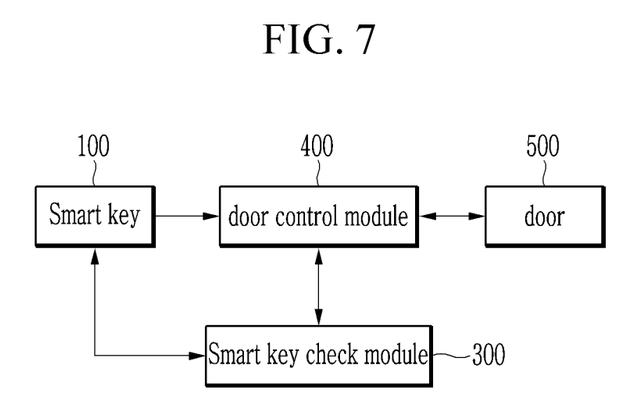
FIG. 7 is a block diagram of the control apparatus of locking or unlocking the door according to various exemplary embodiments of the present disclosure.

FIG. 7 is a block diagram of the control apparatus of locking or unlocking the door according to various exemplary embodiments of the present disclosure. As shown in FIG. 7, the control apparatus of locking or unlocking a door according to various exemplary embodiments of the present disclosure includes the smart key 100, a smart key check module 300, and a door control module 400. The smart key 100 has the door locking and unlocking button and transmits a control signal for locking or unlocking the door through the door locking and unlocking button. The smart key check module 300 may determine whether the smart key 100 is in the vehicle (e.g., in the accommodation groove 210). The door control module 400 may determine whether the vehicle is in the started state or turned-off state. When a vehicle is in the started state, the door control module 400 receives the control signal for locking or unlocking the door from the smart key 100, depending on the result of determining whether the smart key 100 is in the vehicle. After receiving the control signal for locking or unlocking the door from the smart key 100, the door control module 400 may control a corresponding door of the vehicle 500.

Figure 8:
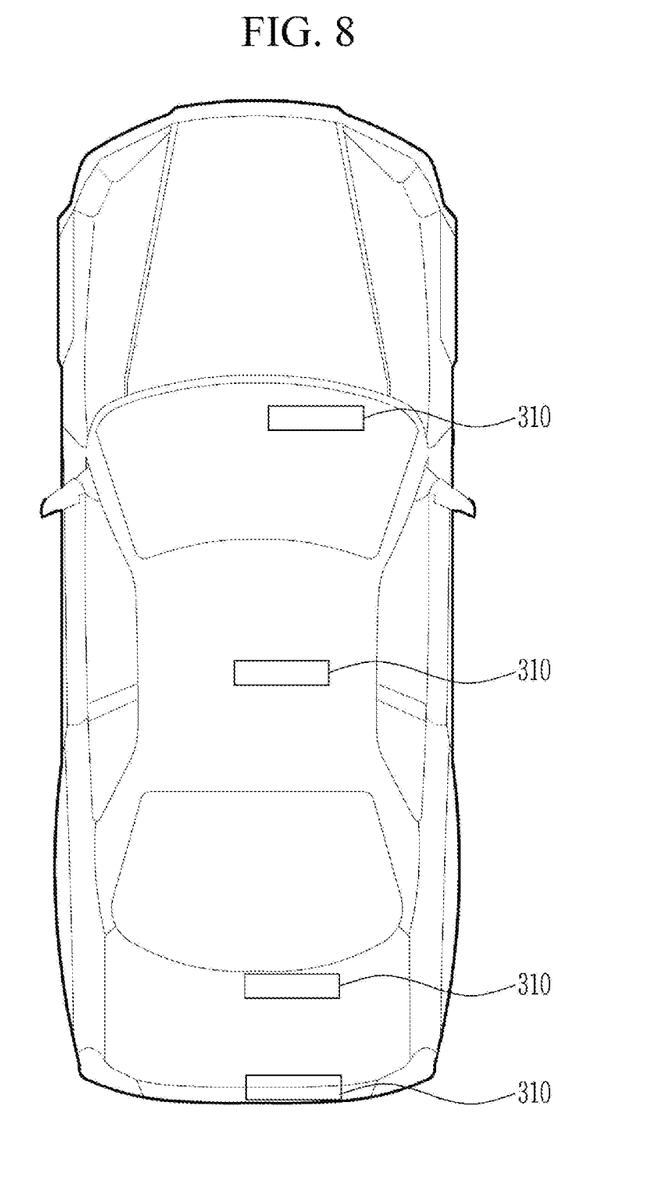
FIG. 8 is a schematic diagram exemplifying that LF antennae are provided in the vehicle.

According to various exemplary embodiments of the present disclosure, the smart key check module 300 may be a Low Frequency (LF) antenna. FIG. 8 is a schematic diagram exemplifying that LF antennae are provided in the vehicle. As shown in FIG. 8, LF antennae 310 may be provided in a center armrest box, a center roof, a vehicle rear bumper, and a vehicle trunk. The operation principle of the LF antennae 310 that determines whether the smart key 100 is in the vehicle is that each of the LF antennae 310 in the vehicle transmits an LF signal and the smart key 100 transmits a response signal when receiving the LF signal of each of the LF antennae 310, in which the response signal includes signal intensity of each antenna that the smart key 100 detected. The LF antennae 310 receive the response signal, determine an area where the smart key 100 is positioned in accordance with the signal intensity of each antenna in the response signal, and determine whether the smart key 100 is in the vehicle.

The smart key check module 300 may be configured to determine whether the smart key 100 is in the vehicle when the door is opened or closed or when a button for starting the vehicle is pressed. Opening or closing of the door may mean that the user with the smart key 100 gets in or out of the vehicle, and in the instant case, it is required to determine the position of the smart key 100. The button for starting the vehicle may be an ACC/IGN button, and when the ACC/IGN button is pressed, it means a change in the state of the vehicle. Accordingly, it is required to determine the position of the smart key 100 so that the door control module 400 is configured to control the door in accordance with the position of the smart key 100 in various states of the vehicle.

According to various exemplary embodiments of the present disclosure, when the vehicle is in the turned-off state, the door control module 400 receives the control signal for locking or unlocking the door from the smart key 100. For example, when the user approaches the vehicle parked in a parking lot, it is possible to unlock the door using the smart key 100 and then start the vehicle or it is possible to lock the door using the smart key 100 after the user turns off the vehicle and gets out of the vehicle.

If the smart key check module 300 determines that the smart key 100 is in the vehicle when the vehicle is in the started state, the door control module 400 receives the control signal for locking or unlocking the door from the smart key 100. For example, when a driver parks the vehicle by a roadside and a passenger needs to get in or out of the vehicle with the shift lever at the neutral position and without the vehicle being turned off, it is possible to unlock the door using the smart key 100 and lock the door using the smart key 100 after the passenger sits on a seat.

If the smart key check module 300 determines that the smart key 100 is not in the vehicle when the vehicle is in the started state, the door control module 400 does not receive the control signal for locking or unlocking the door from the smart key 100. For example, when the user gets out of the vehicle with the smart key 100 but the vehicle is still in the started state and is not turned off, the driver cannot lock the door using the smart key 100.

In the present specification, the started state means the state of ACC ON, ACC START, IGN ON, or IGN START.

According to various exemplary embodiments of the present disclosure, the door control module 400 may be implemented through the IBU and the ICU provided in a vehicle. The IBU selects whether to receive the control signal for locking or unlocking a door from the smart key 100 based on the state of the vehicle detected by sensors and whether the smart key 100 is in the vehicle determined by LF antennae. After the IBU receives the control signal for locking or unlocking the door from the smart key 100, the ICU is configured to control the door 500 using electronic parts such as the electronic relay and the motor in the vehicle.

Figure 9:
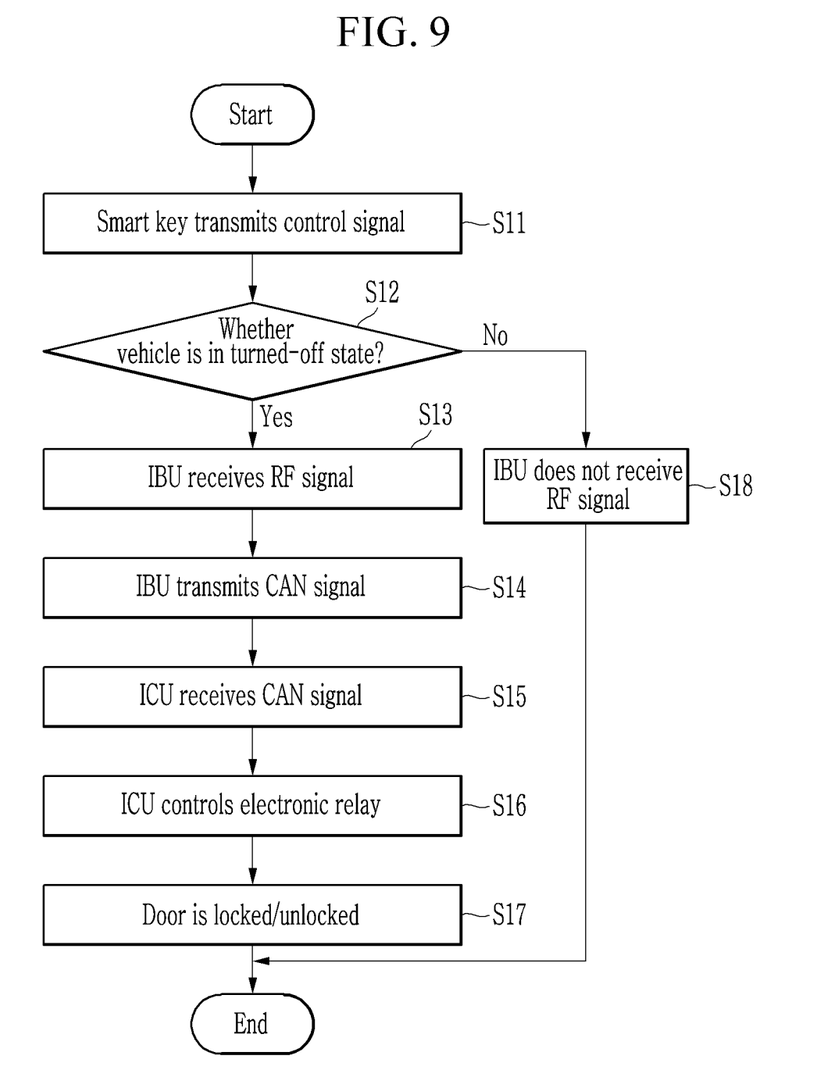
FIG. 9 is a flowchart of a common control method for locking or unlocking the door.

FIG. 9 is a flowchart of a common control method for locking or unlocking the door. As shown in FIG. 9, the smart key has the door locking and unlocking button. When the user moves with the smart key close to or away from the vehicle, the smart key is configured to transmit the control signal for locking or unlocking the door through the door locking and unlocking button at step S11, wherein the control signal may be the RF signal. Thereafter, the IBU may selectively receive the RF signal of the smart key, depending on whether the vehicle is in the turned-off state at step S12. The IBU provided in the vehicle may include the RF receiver for receiving the RF signal of the smart key.

When the vehicle is in the turned-off state ("YES" at the step S12), the IBU receives the RF signal of the smart key through the RF receiver at step S13, converts the received RF signal of the smart key into the CAN signal, and transmits the CAN signal of the smart key to the ICU through the CAN communication of the vehicle at step S14. The ICU receives the CAN signal at step S15 and then is configured to control the electronic relay in the vehicle at step S16, controlling locking and unlocking of the door at step S17. When the vehicle is in the started state ("NO" at the step S12), the IBU does not receive the RF signal of the smart key at step S18.

Figure 10:
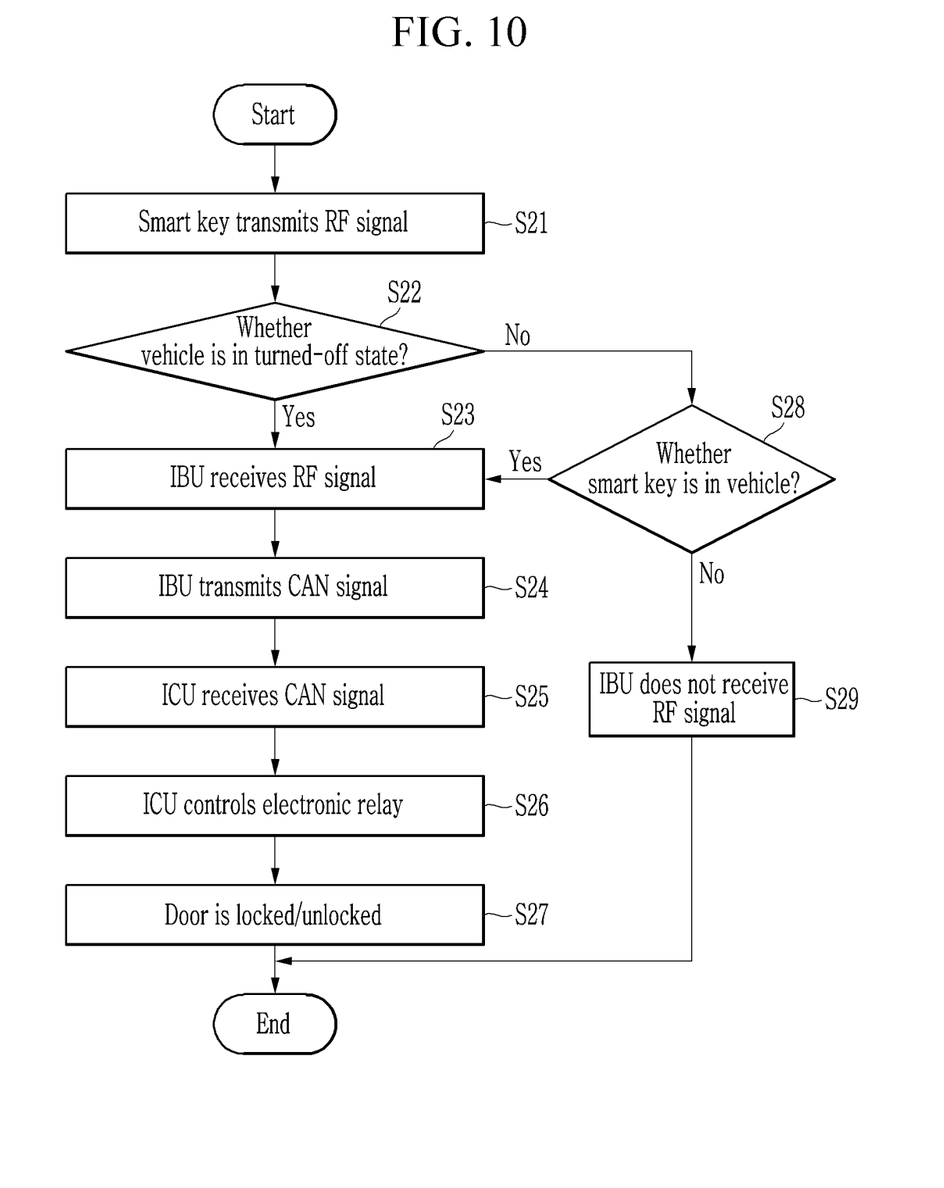
FIG. 10 is a flowchart of a control method for locking or unlocking the door according to various exemplary embodiments of the present disclosure.

FIG. 10 is a flowchart of a control method for locking or unlocking the door according to various exemplary embodiments of the present disclosure. As shown in FIG. 10, when the user moves with the smart key close to or away from the vehicle, the control signal for locking or unlocking the door is transmitted through the door locking and unlocking button at step S21, wherein the control signal may be the Radio Frequency (RF) signal.

Whether the vehicle is in the turned-off state, that is, whether the vehicle is in the started state or in the turned-off state is determined by the door control module (e.g., a sensor, etc.) at step S22. When the vehicle is in the started state, the smart key check module 300 determines whether the smart key 100 is in the vehicle at step S28. When the door is opened or closed or when the button for starting the vehicle is pressed, the smart key check module 300 determines whether the smart key 100 is in the vehicle.

According to various exemplary embodiments of the present disclosure, the smart key 100 may be disposed in the accommodation groove 210 on the armrest 200 of the door trim in the vehicle and the door locking and unlocking button is not provided on the armrest 200 of the door trim. The magnet is provided in each of the smart key 100 and the accommodation groove 210, and the smart key may be attached in the accommodation groove 210 by the magnets. The slot 220 for disposing and picking up the smart key 100 is further provided at any one end portion of the accommodation groove 210. The smart key 100 and the accommodation groove 210 may be matched through the protrusions and depressions structure. The accommodation groove 210 may be disposed in the horizontal direction or the vertical direction with respect to the armrest 200 of the door trim.

It is determined whether to receive the control signal for locking or unlocking the door from the smart key 100 by the door control module 400 based on the result of determining whether the smart key 100 is in the vehicle. When receiving the control signal for locking or unlocking the door from the smart key 100, the door control module 400 performs a corresponding door of the vehicle control. In detail, the door control module 400 may include the IBU and the ICU.

If it is determined that the smart key 100 is in the vehicle ("YES" at the step S28) when the vehicle is in the started state ("NO" at the step S22), the control signal for locking or unlocking the door from the smart key 100 is received through the IBU at step S23. However, when it is determined that the smart key 100 is not in the vehicle ("NO" at the step S28), the control signal for locking or unlocking the door from the smart key 100 is not received through the IBU at step S29.

When the vehicle is in the turned-off state ("YES" at the step S22), the control signal for locking or unlocking the door from the smart key 100 is received through the IBU at the step S23.

After the IBU receives the control signal for locking or unlocking a door from the smart key 100 at the step S23, the ICU locks or unlocks the corresponding door by controlling the door at step S27. Steps S24 to S27 are the same as the steps S14 to S17 described above, so repeated description is omitted.

The effects of the control apparatus and the method for locking or unlocking the door according to various exemplary embodiments of the present disclosure are as follows.

Because the smart key substitutes for the door locking and unlocking button provided on the armrest of a door trim, it is possible to decrease the costs for mounting the door locking and unlocking button on the armrest of the door trim. Furthermore, the integrated design of the door locking and unlocking button on the smart key can reduce operation difficulty of the user.

The space in which the door locking and unlocking button is disposed on the door trim in the related art is used as the accommodation groove for disposing the smart key, and the user can conveniently keep the smart key in the fixed place, so it is possible to prevent loss of the smart key. As for shared cars or rental cars, the user is not only prevented from losing the smart key, but also regulates use of the cars.

Various exemplary embodiments of the present disclosure are for explaining representative aspects of the present disclosure without forming a complete list of all available combinations, and the contents referred to as various embodiments may be applied independently or in a combination of two or more.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A control apparatus of locking or unlocking a door, the control apparatus comprising:
    a smart key including a door locking and unlocking button provided thereon and configured for transmitting a control signal for locking or unlocking the door through the door locking and unlocking button;
    a smart key check module configured to determine whether the smart key is in a vehicle; and
    a door control module configured to:
        determine whether the vehicle is in a started state or a turned-off state,
        determine whether to receive the control signal for locking or unlocking the door from the smart key, according to a result of the determining of whether the smart key is in the vehicle when the vehicle is in the started state, and
        control a corresponding door of the vehicle when receiving the control signal for locking or unlocking the door from the smart key,
    wherein the door control module is configured to receive the control signal for locking or unlocking the door from the smart key when the smart key check module concludes that the smart key is in the vehicle when the vehicle is in the started state, and
    wherein the door control module is configured not to receive the control signal for locking or unlocking the door from the smart key when the smart key check module concludes that the smart key is not in the vehicle when the vehicle is in the started state.

2. The control apparatus of claim 1, wherein the door control module is configured to receive the control signal for locking or unlocking the door from the smart key when the vehicle is in the turned-off state.

3. The control apparatus of claim 1, wherein the smart key check module is configured to determine whether the smart key is in the vehicle when the door is opened or closed or when a button for starting the vehicle is pressed.

4. A control apparatus of locking or unlocking a door, the control apparatus comprising:
    a smart key including a door locking and unlocking button provided thereon and configured for transmitting a control signal for locking or unlocking the door through the door locking and unlocking button;
    a smart key check module configured to determine whether the smart key is in a vehicle; and
    a door control module configured to:
        determine whether the vehicle is in a started state or a turned-off state,
        determine whether to receive the control signal for locking or unlocking the door from the smart key, according to a result of the determining of whether the smart key is in the vehicle when the vehicle is in the started state, and
        control a corresponding door of the vehicle when receiving the control signal for locking or unlocking the door from the smart key,
    wherein the smart key is configured to be disposed in an accommodation groove on an armrest of a door trim, and
    wherein the door locking and unlocking button is not provided on the armrest of the door trim.

5. The control apparatus of claim 4, wherein a magnet is provided in at least one of the smart key and the accommodation groove, and the smart key is attachable in the accommodation groove by the magnet.

6. The control apparatus of claim 4, wherein the smart key and the accommodation groove are matched through a protrusion and a depression thereof.

7. The control apparatus of claim 4, wherein a slot for disposing and picking up the smart key is further provided at an end portion of the accommodation groove.

8. The control apparatus of claim 4, wherein the accommodation groove is disposed in a longitudinal direction of the armrest or a direction vertical to the longitudinal direction.

9. A control method for locking or unlocking a door, the control method comprising:
    transmitting a control signal for locking or unlocking the door through a door locking and unlocking button provided on a smart key;
    determining, by a smart key check module, whether the smart key is in a vehicle;
    determining, by a door control module, whether the vehicle is in a started state or a turned-off state;
    determining, by the door control module, whether to receive the control signal for locking or unlocking the door from the smart key, according to a result of the determining of whether the smart key is in the vehicle when the vehicle is in the started state; and controlling, by the door control module, a corresponding door of the vehicle when receiving the control signal for locking or unlocking the door from the smart key, wherein the control signal for locking or unlocking the door is received from the smart key by the door control module when the smart key check module concludes that the smart key is in the vehicle when the vehicle is in the started state, and wherein the control signal for locking or unlocking the door is not received from the smart key by the door control module when the smart key check module concludes that the smart key is not in the vehicle when the vehicle is in the started state.

10. The control method of claim 9, wherein the control signal for locking or unlocking the door is received from the smart key by the door control module when the vehicle is in the turned-off state.

11. The control method of claim 9, wherein whether the smart key is in the vehicle is determined by the smart key check module when the door is opened or closed or when a button for starting the vehicle is pressed.

12. A control method for locking or unlocking a door, the control method comprising:

transmitting a control signal for locking or unlocking the door through a door locking and unlocking button provided on a smart key;

determining, by a smart key check module, whether the smart key is in a vehicle;

determining, by a door control module, whether the vehicle is in a started state or a turned-off state;

determining, by the door control module, whether to receive the control signal for locking or unlocking the door from the smart key, according to a result of the determining of whether the smart key is in the vehicle when the vehicle is in the started state; and controlling, by the door control module, a corresponding door of the vehicle when receiving the control signal for locking or unlocking the door from the smart key, wherein the smart key is disposed in an accommodation groove on an armrest of a door trim, and wherein the door locking and unlocking button is not provided on the armrest of the door trim.

13. The control method of claim 12, wherein a magnet is disposed in at least one of the smart key and the accommodation groove, and the smart key is attachable in the accommodation groove by the magnet.

14. The control method of claim 12, wherein the smart key and the accommodation groove are matched through a protrusion and a depression thereof.

15. The control method of claim 12, wherein a slot for disposing and picking up the smart key is further provided at an end portion of the accommodation groove.

16. The control method of claim 12, wherein the accommodation groove is disposed in a longitudinal direction of the armrest or a direction vertical to the longitudinal direction.

* * * * *